United States Patent Office 2,975,603
Patented Mar. 21, 1961

2,975,603

CARBONATED ICE, PROCESS, AND PRODUCT

Harry M. Barnes, Valley Cottage, N.Y., and Leon T. Kremzner, Upper Saddle River, and William A. Mitchell, Lincoln Park, N.J., assignors to General Foods Corporation, White Plains, N.Y., a corporation of Delaware No Drawing. Filed Apr. 7, 1958, Ser. No. 726,657

8 Claims. (Cl. 62—1)

This invention relates to a novel technique for storing gas in a limited volume. More specifically it relates to a novel process for attaining an effervescent beverage and to a product which when added to water gives such a beverage.

As is well known to those skilled-in-the-art, a wide variety of bottled carbonated beverages is consumed. It has been found that the expense and inconvenience involved in handling bottled beverages is high. In an effort to eliminate the bottling problem, numerous techniques have been proposed. Most widely known is the carbonation of the drink at the point of consumption—typically at a soda fountain—by directly mixing carbon dioxide gas under pressure with a liquid being dispensed. Another technique more suited to the individual consumer is the use of small steel containers of carbon dioxide which discharge gas into the liquid. These techniques may each find use in particular circumstances, but they require particular apparatus which is not usually found in the home of the consumer.

Another attempt to eliminate the various problems which are generally recognized includes the use of a variety of powders which upon addition to water release a gas which carbonates the beverage. Among the widely acknowledged defects of such systems are the lack of stability of many of the preparations; the special packaging and handling requirements; the high initial loss of effervescence on mixture with liquid; the all-too-brief period during which the beverage effervesces; and the unpleasant taste of the beverage directly resulting from the components of the powder.

Although some of the items currently available or known may solve one or more of the problems, there is none which permits ready formation of a cold carbonated drink possessing a pleasant taste and long carbonation life.

One object of this invention is to provide a product which upon addition to a liquid will give a cold beverage characterized by a long carbonation life and freedom from unpleasant taste. A second object is to provide a solid readily handleable source of carbon dioxide. Other objects will be apparent to those skilled-in-the-art on inspection of the following description.

According to one aspect of this invention, a carbonated ice characterized by its long storage life and its ability to form a superior effervescent beverage on mixture with aqueous liquid may be prepared by subjecting aqueous liquid to a carbon dioxide pressure of at least about 200 p.s.i.g. and preferably less than about 600 p.s.i.g.; maintaining said aqueous liquid and said carbon dioxide in contact for time sufficient to permit absorption in said liquid of carbon dioxide in the form of bound carbon dioxide and formation of carbonated ice containing at least about 25–27.5 milliliters of carbon dioxide per gram of ice, maintaining the temperature of said liquid and carbon dioxide during said absorption within the carbonated-ice-freezing temperature range, and withdrawing carbonated ice.

In carrying out the process of this invention, the carbonated ice product will preferably be prepared from water. Although some advantages in terms of reproducibility of precise conditions may be obtained by using distilled water, it is one of the features of this invention that ordinary tap water can be employed without any pretreatment. If it be desired to prepare colored or flavored beverages, the appropriate amount of color or flavor may be added to the water. Some sugar may also be added if desired. The term water will hereinafter employed to include water containing these materials as well as water, per se.

It may be possible to conduct the process of this invention continuously or batchwise. Under preferred conditions, the water may be placed within any suitable apparatus which is capable of withstanding the various temperatures and pressures prevailing during the course of the process. Carbon dioxide, in requisite amount, as hereinafter noted, is then admitted to the reaction vessel. It may be possible to add the carbon dioxide in solid or liquid form; under preferred conditions, it will be admitted in gaseous form.

When the reaction is conducted batchwise and the carbon dioxide is to be added in gaseous form, the water is agitated and carbon dioxide gas under desired pressure is admitted to the reaction chamber. Although the pressure of the carbon dioxide may be varied somewhat depending upon the prevailing conditions, it is preferred to maintain a pressure of at least 200 p.s.i.g. and less than about 600 p.s.i.g. Preferred pressure is 300 p.s.ig.–500 p.s.i.g.

It is possible in accordance with prior art techniques, to incorporate small amounts of gaseous carbon dioxide into water at low pressures and to freeze the resulting mixture to give a carbonated ice. For example, if the carbon dioxide pressure be 50 p.s.i.g., the volume of carbon dioxide enclosed within the ice may be only of the order of about 4–5 milliliters of gas per gram of ice; if the pressure be increased to e.g. 70 p.s.i.g., the gas content is raised to e.g. about 8; even if the pressure be increased to about 150 p.s.i.g., the gas content is only increased to about 14–15.

It is a feature of this invention that use of gas pressures above approximately 200 p.s.i.g. permits attainment of ice containing an unexpectedly large proportion of carbon dioxide. Below about 200 p.s.i.g., the maximum ratio appears to be not more than about 25–27.5 milliliters of carbon dioxide per gram of ice. As higher pressures are used, up to about 600 p.s.i.g., it is possible to increase the amount of carbon dioxide in the product ice after a particular time, or alternatively to obtain in a shorter time, much greater amounts up to a level of about 120 milliliters of carbon dioxide per gram of ice. Preferably the pressure of operation will be 300–400 p.s.i.g.

The temperature of the aqueous liquid during pressurization thereof with carbon dioxide should be (a) above the freezing point of that liquid under the prevailing pressure i.e. above about 0° C. when pure water is employed; and preferably (b) slightly below the freezing point of the product ice under the conditions of operation. The temperature of the system during the reaction, as above defined, will be referred to as the carbonated-ice-freezing range and will encompass the range from about 0° C. up to the freezing point of the carbonated ice which may be as high as 14° C. or more. The reaction mixture may be maintained, by appropriate means e.g. immersion in a bath, at the desired temperature. As the gas is absorbed into the agitated liquid, more gas may be admitted to the system to maintain gas pressure at the desired level within the preferred limits of 200 p.s.i.g.–600 p.s.i.g. Preferably the gas pressure will be maintained constant during the course of the reaction.

The time of contact of the liquid and the gas and the other conditions noted may vary somewhat depending on the particular characteristics of the system in which the reaction is carried out. Typically, however, the time of reaction will be controlled to give the desired amount of gas in the product varying from e.g. 25–27.5 to about 100 milliliters per gram of ice. It will be preferably controlled to give at least about 50–90 ml. per gram.

At the end of the desired time, the frozen product will be removed from the reaction vessel and may generally be used as so-obtained. However, when it has been prepared at pressures above about 400 p.s.i.g., it is preferred that it be degassed or stabilized for about 24 hours at about −10° C. During this period, any carbon dioxide which may loosely be held within the product is evolved. Liquid carbon dioxide, which may be within the mass, generally volatilizes and passes off from the solid product during this degassing period. The various analytical techniques for determining the amount of gas within the "product" ice, etc. are conducted on this degassed or stabilized product.

The freezing points of the carbonated ices prepared in accordance with this invention are all above 0° C. and may be as high as 14° C. or more. In this respect, they differ from ices containing lesser amounts of carbon dioxide and from ices prepared at pressure below those prescribed for the process of this invention. Ices prepared at pressure less than about 200 p.s.i.g. and/or containing less than about 25–27.5 milliliters of carbon dioxide per gram of ice, have melting points which are at or below 0° C.

There is a further indication of a discontinuity which may indicate that there is unexpected compound formation or some unusual bonding force other than mere physical entrapment of the gas by the ice when the process is carried out above the minimum pressure noted. It has been found that it is not possible to prepare a carbonated ice containing a higher ratio of gas to solid than about 25–27.5 when the pressure of operation is less than about 200 p.s.i.g. For example, if the process is conducted at 100 p.s.i.g., a maximum ratio of about 11 is obtained after about 30 minutes and the ratio is maintained at about this level regardless of how much longer the pressurization is conducted. If the pressure be about 150 p.s.i.g., the asymtotic maximum, also reached after about thirty minutes, is about 14–15.

It thus appears that under the particular conditions of operation prescribed for this process that the carbon dioxide retained in the product in ratios greater than 25–27.5 is present in some unusual or unexpected form. The term "bound carbon dioxide" may be used to describe this gas and specifically it refers to the carbon dioxide which, in amount greater than 27–27.5 milliliters per gram of ice, is not vaporized from the carbonated ice of this invention when the latter is degassed at −10° C. for 24 hours and which, in view of the above-noted anomalous behavior, appears to be present in a characteristic but unexpected manner.

As the pressure is increased above 200 p.s.i.g., the plots of gas within the ice as a function of time of contact generally quickly reach a plateau at or substantially above about 27.5; remain at this plateau for a brief period of time which decreases as the pressure increases; and then rise higher, the height generally increasing as the pressure increases. For example, in one series of runs, the gas enclosed at 200, 300, and 400 p.s.i.g. was about 27.5, 92, and 115 volumes of gas per gram of ice, respectively, after 120 minutes of stirring at a temperature of 0° C. It is possible, by operating at different pressures within the limits herein noted, to obtain the same level of gas enclosure by varying the time.

The upper limit of the range of pressures which can be employed, for all practical purposes, will be about 600 p.s.i.g. More specifically, it is found that the product carbonated ice is more stable when the pressure of the carbon dioxide is correlated with the temperature of the water-carbon dioxide mixture so that the pressure is less than the liquid-vapor equilibrium pressure of carbon dioxide at that temperature.

The carbonated ice so-prepared resembles ordinary ice. It may be cloudy or clear in appearance, and is free of liquid. It is a particular feature of this invention that when prepared according to the preferred technique, the ice-product has a freezing point substantially above 0° C., i.e. it may be as high as 14° C. or more. Most commonly, it will be about 4° C.–8° C.

The most characteristic feature of the carbonated ice product is its ability to release gas for an extended time and at a controlled rate when added to an aqueous liquid, to give a cold carbonated beverage. The life (i.e. the period of satisfactory carbonation) of a beverage prepared from this product compares favorably with that of the life of presently available carbonated beverages.

Use of the carbonated ice of this invention gives a drink which is free of undesirable saline or otherwise unpleasant taste because the components of the ice blend perfectly well with those of the drink without production of distasteful or otherwise undesirable by-products. When the ice is added to a liquid, it is noted that the number of bubbles liberated is greater than the number of bubbles in a standard bottled carbonated beverage and the size of the bubbles in each is about the same.

The density of the product may be of the order of 0.94 g. per cc.–0.99 g. per cc. or higher which is slightly heavier than ordinary ice which has a density of about 0.92 g. per cc. The stability of the novel product of this invention is good below 0° C. Its initial stability is favorable in that any carbon dioxide which is not securely locked within the ice matrix is readily liberated during the degassing period without danger of explosion or product deterioration. After this degassing the stabilized product has a shelf life which is at least 30 days, and usually substantially longer, when the ice is maintained under controlled conditions of temperature. It is stable for an extended time under normal freezing conditions in a household freezer, i.e. at −10° C.

The novel carbonated ice of this invention preferably contains at least about 25 milliliters of gas per gram of ice, which is roughly equivalent to 25 volumes of gas per volume of ice. Although it is readily possible to produce carbonated ice containing ratios of gas to solid as high as 100–115, the preferred product of this invention will contain a ratio of 50–90 and this will be prepared at 300–400 p.s.i.g. It is found that such a product, i.e. one containing a ratio of 50–90 is characterized by its high stability and large number and proper size of bubbles in the beverage formed therefrom.

According to a specific example of this invention, 300 ml. of water at 25 C. was placed within a Parr Pressure Reactor of two-liter capacity. The vessel was closed, agitation started, and carbon dioxide was admitted thereto at 400 p.s.i.g. The vessel was placed within a constant temperature bath which maintained the contents at just slightly above 0° C. The carbon dioxide feed was adjusted to keep the pressure at 400 p.s.i.g. during the course of the reaction. After 75 minutes, the vessel was removed from the bath, depressurized, and opened. The contents were removed and the solid ice was stored for 24 hours at minus 10° C. to effect degasification. Testing of the degasified product revealed that it had a carbon dioxide content of 70 volumes of carbon dioxide per gram of ice.

The degasified carbonated ice in superficial appearance resembled ordinary ice. It had a density of about 0.97 g. per cc. On dropping a compact piece having a volume of about 30 cc. (roughly the equivalent of a "standard" ice cube) into 250 ml. of water, a vigorous evolution of gas was observed. The average bubble size and quantity gave a resulting beverage which closely resembled the familiar "club soda" carbonated drink. The carbonated ice cube lasted for about the same period of time as did an ordinary ice cube of the same size stirred in an identical glass of water.

A second sample of the carbonated ice was subjected to storage tests in a refrigerator at −10° C. It was tested and no loss of carbon dioxide gas was apparent during 33 days.

In order to set forth the unusual features of the instant invention more clearly by contrasting it with unsatisfactory prior art techniques, a sample of ice was prepared containing 5 volumes of gas by pressurizing water with 70 p.s.i.g. of carbon dioxide and then subjecting the carbonated mixture to freezing. The product formed under these conditions had a freezing point which was lower than that of water.

A compact piece, about 30 cc. volume, was dropped into 250 ml. of water. It was noted that the evolution of gas was barely noticeable and the carbonation of the liquid was extremely low. The bubbles which evolved were much too small in size and the quantity thereof was inadequate to effect carbonation. The final mixture, upon tasting, did not give a true soda taste and it was found to be flat after a few minutes.

In all respects the product prepared by carbonation at 70 p.s.i.g. was eminently inferior to the novel product of applicants' invention.

It will be apparent to those skilled-in-the-art that the carbonated ice product as herein disclosed possesses a wide variety of uses. This carbonated ice may be employed as a means of transporting or storing quantities of carbon dioxide, it being noted that once the ice is formed it is no longer required to be maintained under superatmospheric pressure. It is possible by use of this novel product to liberate carbon dioxide as desired in the home or in the laboratory.

What is claimed is:

1. The process of producing a carbonated ice characterized by its long storage life and its ability to form a superior effervescent beverage on mixture with liquid which comprises subjecting aqueous liquid to a carbon dioxide pressure of at least about 200 p.s.i.g. and less than the liquid-vapor equilibrium pressure of carbon dioxide at the prevailing carbonated-ice-freezing temperature range of above 0° C. to about 14° C., maintaining said aqueous liquid and carbon dioxide in contact for time sufficient to permit absorption by said aqueous liquid of at least about 25–27.5 milliliters of carbon dioxide per gram of water, and withdrawing carbonated ice.

2. The process of producing a carbonated ice characterized by its long storage life and its ability to form a superior effervescent beverage on mixture with liquid which comprises subjecting water to a carbon dioxide pressure of at least about 200 p.s.i.g. and less than about 600 p.s.i.g., maintaining said water and carbon dioxide in contact for time sufficient to permit absorption by said water of at least about 25–27.5 milliliters of carbon dioxide per gram of water, maintaining the temperature of said water and carbon dioxide during said absorption within the carbonated-ice-freezing temperature range of above 0° C. to about 14° C., and withdrawing carbonated ice.

3. The process of producing a carbonated ice characterized by its long storage life and its ability to form a superior effervescent beverage on mixture with liquid which comprises subjecting water to a carbon dioxide pressure of at least about 200 p.s.i.g. and less than about 600 p.s.i.g., maintaining said water and carbon dioxide in contact for time sufficient to permit absorption by said water of about 25–115 milliliters of carbon dioxide per gram of water, maintaining the temperature of said water and carbon dioxide during said absorption within the carbonated-ice-freezing range of above 0° C. to about 14° C., and withdrawing carbonated ice.

4. The process claimed in claim 3 wherein the said withdrawn carbonated ice is permitted to stand for about 24 hours whereby the said ice becomes degasified and stabilized.

5. The process of producing a carbonated ice characterized by its long storage life and its ability to form a superior effervescent beverage on mixture with liquid which comprises subjecting water to a carbon dioxide pressure of about 300 p.s.i.g.–400 p.s.i.g., maintaining said water and carbon dioxide in contact for time sufficient to permit absorption by said water of about 50–90 milliliters of bound carbon dioxide per gram of water, maintaining the temperature of said liquid and carbon dioxide during said absorption within the carbonated-ice-freezing range of above 0° C. to about 14° C., and withdrawing carbonated ice.

6. The process of producing a carbonated ice characterized by its long storage life and its ability to form a superior effervescent beverage on mixture with liquid which comprises subjecting water to a carbon dioxide pressure of about 400 p.s.i.g., maintaining said water and carbon dioxide in contact for time sufficient to permit absorption by said water of about 70 milliliters of carbon dioxide per gram of water, maintaining the temperature of said water and carbon dioxide during said absorption within the carbonated-ice-freezing range of above 0° C. to about 14° C., and withdrawing carbonated ice containing 70 milliliters of bound carbon dioxide per gram of ice.

7. A carbonated ice product characterized by its long storage life and ability to react with liquid to provide an effververscent beverage of pleasant taste and long carbonation life comprising ice containing at least 25–27.5 milliliters of bound carbon dioxide per gram of ice prepared at a pressure of at least about 200 p.s.i.g. and less than about 600 p.s.i.g.

8. A carbonated ice product characterized by its long storage life and ability to react with liquid to provide an effervescent beverage of pleasant taste and long carbonation life comprising ice containing 25–115 milliliters of bound carbon dioxide per gram of ice prepared at a pressure of at least about 200 p.s.i.g. and less than about 600 p.s.i.g.

References Cited in the file of this patent

UNITED STATES PATENTS

| | | |
|---|---|---|
| 2,240,769 | Glazer | May 6, 1941 |
| 2,575,509 | Bayston | Nov. 20, 1951 |

UNITED STATES PATENT OFFICE
CERTIFICATION OF CORRECTION

Patent No. 2,975,603

March 21, 1961

Harry M. Barnes et al.

It is hereby certified that error appears in the above numbered patent requiring correction and that the said Letters Patent should read as corrected below.

Column 2, line 10, before "hereinafter" insert -- be --; column 3, line 55, for "27-27.5" read -- 25-27.5 --.

Signed and sealed this 5th day of September 1961.

(SEAL)
Attest:

ERNEST W. SWIDER
Attesting Officer

DAVID L. LADD
Commissioner of Patents